H. LEMP.
INTERNAL COMBUSTION ENGINE.
APPLICATION FILED AUG. 2, 1916.

1,334,104.

Patented Mar. 16, 1920.

Inventor:
Hermann Lemp,
by Albert G. Davis
His Attorney

UNITED STATES PATENT OFFICE.

HERMANN LEMP, OF ERIE, PENNSYLVANIA, ASSIGNOR TO GENERAL ELECTRIC COMPANY, A CORPORATION OF NEW YORK.

INTERNAL-COMBUSTION ENGINE.

1,334,104.  Specification of Letters Patent.  Patented Mar. 16, 1920.

Application filed August 2, 1916. Serial No. 112,833.

*To all whom it may concern:*

Be it known that I, HERMANN LEMP, a citizen of the United States, residing at Erie, county of Erie, State of Pennsylvania, have invented certain new and useful Improvements in Internal-Combustion Engines, of which the following is a specification.

The present invention relates to internal combustion engines and has for its object to provide an improved arrangement for lubricating the piston or pistons thereof.

For a consideration of what I believe to be novel and my invention, attention is directed to the accompanying specification and the claims appended thereto.

Figure 1:
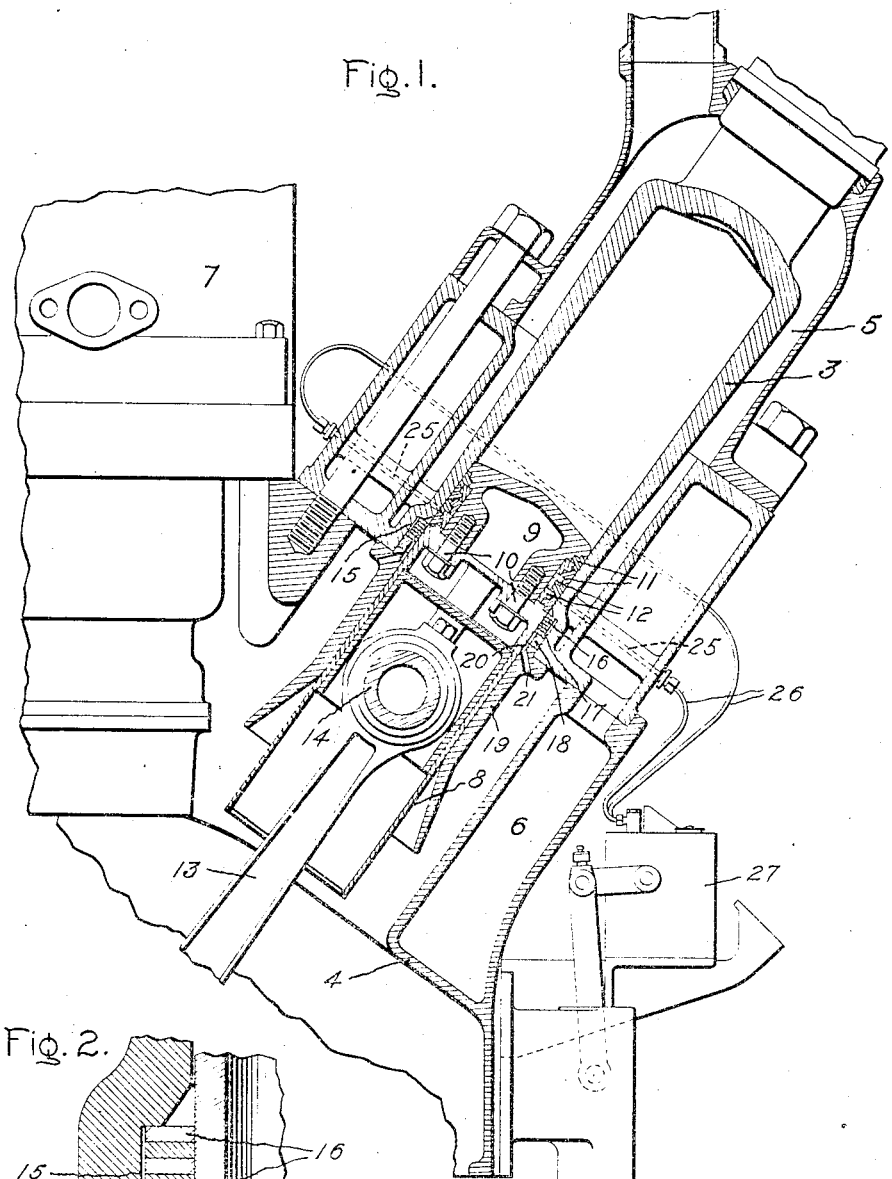
Figure 2:
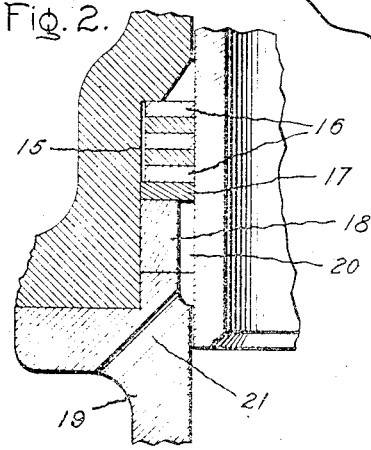

In the accompanying drawing, Figure 1 is a sectional view through the cylinder and piston of an internal combustion engine embodying my invention, and Fig. 2 is an enlarged sectional view of certain of the parts.

Referring to the drawing, 3 indicates the cylinder of an internal combustion engine and 4 a part of the base thereof. In the present instance the cylinder illustrated in one of the cylinders of a V-type multi-cylinder engine of the high compression type, but it will be understood that the invention is not limited to any specific type of engine. 5 indicates the water jacket for the cylinder and 6 a receiver for containing scavenging air, a part of the scavenging air pump being indicated at 7. The piston is of the trunk type and comprises a body member 8 to which is attached a hollow head 9 by means of bolts 10. Between the head and the body member is a piston packing comprising T-shaped piston rings 11 and L-shaped follower rings 12. The outer ends or heads of the piston rings 11 overlap the follower rings 12 and contact each other so that there are no spaces between them. This avoids the usual spaces ordinarily found between successive rings and in which lubricant is very apt to be caked or carbonized. 13 indicates the connecting rod and 14 the wrist pin which connects it to the piston. The lower end of the cylinder is counterbored to form an annular groove 15 in which are located a number of split packing rings 16 which are preferably of cast iron, and a single solid lead packing ring 17. These rings 16 and 17 are held in place by a spacing ring 18 and a piston guide 19 which in substance forms a continuation of the cylinder. The spacing ring 18 and the upper end of the piston guide 19 are of greater internal diameter than the piston so that an annular space 20 is left surrounding the piston just below the packing rings 16 and 17, and this annular space is connected to the crank case by a series of openings 21. The function of the packing rings 16 and 17 is to act as scraper rings to scrape back lubricant, which lubricant is returned to the crank case through the openings 21. In performing this function the scraper rings also serve to keep the piston wall clean and bright and free from any deposits of carbon or caked lubricant. The scraper rings are so located in the cylinder wall that when the piston is at the outer end of its stroke the upper edge of the uppermost scraper ring 16 is just at the lower edge of the lowermost packing ring 11. This is shown in Fig. 1 where the piston is shown as having reached the outer end of its stroke. By this arrangement the scraper rings scrape over the entire surface of the piston below the packing rings 11 and the packing rings 11 scrape over the entire inner surface of the cylinder wall above the scraper rings. This results in the entire cylinder and piston being kept clean and bright, and since there are no spaces between the piston packing rings 11 there is no opportunity for lubricant to bake or carbonize at any point on the cylinder or piston surfaces.

It will be understood that in modern engine practice a piston does not fit its cylinder closely and exactly, there being a slight space between them as is indicated to a somewhat exaggerated degree in Fig. 2. Due to this the piston when reciprocating has more or less lateral movement. As will be clear from Fig. 2, the arrangement is such that my spring scraper rings 16 can follow this lateral movement of the piston so that at all times they are in close engagement with the piston wall.

The scraper rings when located and arranged as shown scrape back all the lubricant which is splashed on the piston, except a very thin film, thus preventing any excess of lubricant from the crank case getting by the scraper rings up toward the main piston rings, and for the further lubrication of the piston head I provide one or more openings through the cylinder wall, as indicated at 25, which are located just above the scraper rings and these are connected by a pipe or pipes 26 to a suitable lubricant pump 27, which may be operated from the crank shaft of the engine. This arrangement has the advantage that just the desired amount of lubricant in measured quantities can be supplied for lubricating the piston head and that a different lubricant can be used for the piston head if desired than that used in the crank case. In this connection the scraper rings also perform the additional function of preventing the fresh lubricant, which is supplied by the lubricant pump to the piston head, from being carried down past the scraper rings to the crank case.

The placing of the oil scraper rings in the cylinder and their specific location therein relative to the piston stroke so that they scrape the entire surface of the piston below the piston packing rings, I regard as very important features of my invention as it is due to this that I obtain the very beneficial results of my invention.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means, such as come within the scope of the appended claims.

What I claim as new and desire to secure by Letters Patent of the United States, is,—

1. The combination of a cylinder, a piston therein, packing rings on the head of the piston, and a spring scraper ring located in a groove in the cylinder wall at such a point that the packing rings on the piston just reach it on the out stroke of the piston, said spring scraper ring closely fitting the piston and being adapted to follow its lateral movements whereby the spring ring is always in engagement with the piston throughout its entire circumference so the entire piston surface will be scraped continuously by the ring, said cylinder being provided with an annular chamber for receiving lubricant scraped from the piston and with passages for draining such lubricant from the chamber.

2. The combination in an internal combustion engine, of a cylinder, a piston, packing rings on the head of the cylinder, a spring ring forming an oil scraper located in the cylinder wall at such a point that when the piston is at the outer end of its stroke the packing rings on the head of the cylinder just reach the packing ring which forms the oil scraper, said spring ring closely fitting the cylinder and adapted to follow its lateral movements so that the ring is always in engagement with the piston throughout its circumference, said cylinder wall having an annular chamber therein below the scraper ring, and separate means for lubricating the piston head.

3. The combination of a cylinder, a piston therein, a piston guide member connected with the outer end of the cylinder and forming a continuation thereof, scraper rings located in the cylinder wall and held in position by the piston guide member, an annular chamber surrounding the piston just below the scraper rings, passages in the guide member connecting the chamber to the crank case, and separate means for lubricating the piston head.

4. In combination, a cylinder, a piston therein, packing rings on the head of the piston which completely cover the same leaving no spaces between them, a packing ring forming an oil scraper located in the cylinder wall at such a point that when the piston is at the outer end of its stroke the packing rings on the head of the cylinder just reach the packing ring which forms the oil scraper whereby the entire surface of the cylinder and piston are scraped over and the caking of lubricant thereon prevented, and pump means for supplying lubricant to the piston head to lubricate the same.

5. In combination, a cylinder, a piston therein, packing rings on the head of the piston, an oil scraper ring in the cylinder wall at such a point that the rings on the head of the piston do not pass beyond it on the out-stroke of the piston, said scraper ring acting to scrape lubricant back to the crank case, and pump means for supplying lubricant in measured quantities to the piston head to lubricate the same.

In witness whereof I have hereunto set my hand this 29th day of July, 1916.

HERMANN LEMP.